US012354487B2

(12) United States Patent
Lebak

(10) Patent No.: US 12,354,487 B2
(45) Date of Patent: Jul. 8, 2025

(54) IDENTIFYING AN OBJECT IN AN AREA OF INTEREST

(71) Applicant: The Boeing Company, Chicago, IL (US)

(72) Inventor: Stephen Michael Lebak, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 17/931,006

(22) Filed: Sep. 9, 2022

(65) Prior Publication Data

US 2024/0087463 A1 Mar. 14, 2024

(51) Int. Cl.

| | |
|---|---|
| ***G08G 5/55*** | (2025.01) |
| ***G08G 5/20*** | (2025.01) |
| ***G08G 5/22*** | (2025.01) |
| ***G08G 5/59*** | (2025.01) |

(52) U.S. Cl.

CPC ................ *G08G 5/55* (2025.01); *G08G 5/20* (2025.01); *G08G 5/22* (2025.01); *G08G 5/59* (2025.01)

(58) Field of Classification Search

CPC .... G08G 5/006; G08G 5/0017; G08G 5/0052; G08G 5/0082; G08G 5/0026;

(Continued)

(56) References Cited

U.S. PATENT DOCUMENTS 5,920,318 A * 7/1999 Salvatore, Jr. .......... G01S 13/91 345/418
8,416,122 B1 * 4/2013 Pedersen ................ G06F 17/10 342/96

(Continued)

FOREIGN PATENT DOCUMENTS

CN 102629375 A * 8/2012
JP H-11144041 A * 5/1999

(Continued)

OTHER PUBLICATIONS

"AnT. computational geometry—determine if a given point is inside the polygon," Stack Overflow, Mar. 7, 2011. Forum, available at: <https://stackoverflow.com/questions/5223909/determine-ifa-given-point-is-inside-the-polygon>, accessed on Sep. 9, 2022.

(Continued)

*Primary Examiner* — Ramon A. Mercado
*Assistant Examiner* — Tyler Roger Robarge
(74) *Attorney, Agent, or Firm* — Yee & Associates, P.C.

(57) ABSTRACT

A computer-implemented method and system for identifying an object in an area of interest. The area of interest is enclosed by a boundary comprising a plurality of line segments extending between vertex points. A reference point relative to the area of interest and a reference direction from the reference point are determined and used to determine a vertex angle of each vertex point. The reference point and reference direction also are used to determine an object angle of the object from location information identifying a location of the object. The object angle and the vertex angles are used to identify a number of line segment crossings in the plurality of line segments. An indicator is generated to indicate whether the object is in the area of interest based on the number of line segment crossings.

20 Claims, 13 Drawing Sheets

(58) Field of Classification Search
CPC ...... G06V 10/25; G06V 10/245; G06V 20/00; G06V 10/457; G06V 10/225; G06V 20/60; G06T 7/60; G06T 7/70
See application file for complete search history.

(56) References Cited

U.S. PATENT DOCUMENTS

| | | | | |
|---|---|---|---|---|
| 2014/0018979 | A1* | 1/2014 | Goossen | G05D 1/0016 701/3 |
| 2015/0254988 | A1* | 9/2015 | Wang | G08G 5/57 701/3 |
| 2022/0269290 | A1 | 8/2022 | Dadkhah et al. | |

FOREIGN PATENT DOCUMENTS

| | | | | |
|---|---|---|---|---|
| JP | 2003085569 | A | * | 3/2003 |
| JP | 2003123078 | A | * | 4/2003 |
| JP | 4000117 | B2 | * | 10/2007 |

OTHER PUBLICATIONS

"Hormann et al., The Point in Polygon Problem for Arbitrary Polygons," Computational Geometry: Theory and Applications, Nov. 2001, vol. 20, No. 3, pp. 131-144.

Shimrat, "Algorithm 112: Position of point relative to polygon," Communications of the ACM, Aug. 1962, vol. 5, No. 8, pp. 434-440.

Skala et al., "A Point in Non-convex Polygon Location Problem Using the Polar Space Subdivision in E2, International Conference on Image and Graphics, Tianjin, China: China Society of Image and Graphics, Microsoft Research Asia, 2015, pp. 394-404."

European Patent Office Extended Search Report, dated Feb. 28, 2024, regarding Application No. EP23189936.0, 11 pages.

* cited by examiner

400

IDENTIFYING AN OBJECT IN AN AREA OF INTEREST

BACKGROUND INFORMATION

1. Field

The present disclosure relates generally to systems and methods for determining whether an object is inside of a defined area of interest, and, more particularly, to determining whether a physical object is inside of geographic or other area of interest, such as whether an aircraft is operating inside an airspace area of interest.

2. Background

Special use airspace is an example of an airspace area of interest. Special use airspace is an area designated for operations of a nature such that limitations may be imposed on aircraft not participating in those operations. Often these operations are of a military nature. Examples of special use airspace includes: restricted airspace, prohibited airspace, military operations areas, warning areas, alert areas, temporary flight restriction, national security areas, and controlled firing areas.

Another example of an airspace area of interest is a no-fly zone. A no-fly zone is a territory or area established by a military or other power over which certain aircraft are not permitted to fly. A no-fly zone also may be known as a no-flight zone, or air exclusion zone.

An aircraft area of interest may be identified by an area on the surface of the earth over which the operation of an aircraft may be restricted, forbidden, or hazardous. Aircraft operators and entities responsible for monitoring or controlling aircraft operations in an airspace area of interest are interested in the accurate and timely determination of whether or not an aircraft is within an airspace area of interest.

Therefore, there may be a need for a method and apparatus that take into account at least some of the issues discussed above, as well as other possible issues.

SUMMARY

Illustrative embodiments provide a computer-implemented method of identifying an object in an area of interest. The area of interest is enclosed by a boundary comprising a plurality of line segments extending between vertex points. The computer system determines a reference point relative to the area of interest and a reference direction from the reference point. The computer system determines a vertex angle of each vertex point to provide a plurality of vertex angles. The vertex angle of a vertex point is the angle between the reference direction and a line extending from the reference point to the vertex point. The computer system determines, from location information identifying a location of the object, an object angle of the object. The object angle of the object is the angle between the reference direction and a line extending from the reference point to the object location. The computer system uses the object angle and the plurality of vertex angles to identify a number of line segment crossings in the plurality of line segments and generates an indicator to indicate whether the object is in the area of interest based on the number of line segment crossings.

Illustrative embodiments also provide a computer-implemented method of identifying an object in an area of interest wherein the computer system defines the area of interest. The area of interest is enclosed by a boundary comprising a plurality of line segments extending between vertex points. Vertex points at each end of a line segment in the plurality of line segments are adjacent vertex points. The computer system determines a reference point relative to the area of interest and a reference direction from the reference point. The computer system determines a vertex angle of each vertex point provide a plurality of vertex angles and stores the plurality of vertex angles for the vertex points in a binary search tree. The vertex angle of a vertex point is the angle between the reference direction and a line extending from the reference point to the vertex point. The computer system receives location information identifying a location of the object and determines, from the location information, an object angle of the object from the reference point relative to the reference direction. The object angle of the object is the angle between the reference direction and a line extending from the reference point to the object location. The computer system uses the object angle and the plurality of vertex angles stored in the binary search tree to identify a number of line segment crossings in the plurality of line segments, determines whether the object is in the area of interest based on the number of line segment crossings, and generates an indicator to indicate whether the object is in the area of interest.

The illustrative embodiments also provide an object locating system for identifying an object in an area of interest. The area of interest is enclosed by a boundary comprising a plurality of line segments extending between vertex points. The computer system includes an object locating system that includes an area of interest processor located in the computer system, and an object location processor located in the computer system. The area of interest processor is configured to determine a reference point relative to the area of interest and a reference direction from the reference point and to determine a vertex angle of each vertex point to provide a plurality of vertex angles. The vertex angle of a vertex point is the angle between the reference direction and a line extending from the reference point to the vertex point. The object location processor is configured to determine, from location information identifying a location of the object, an object angle of the object, to use the object angle and the plurality of vertex angles to identify a number of line segment crossings in the plurality of line segments, and to generate an indicator to indicate whether the object is in the area of interest based on the number of line segment crossings. The object angle of the object is the angle between the reference direction and a line extending from the reference point to the object location.

Features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

Figure 1:
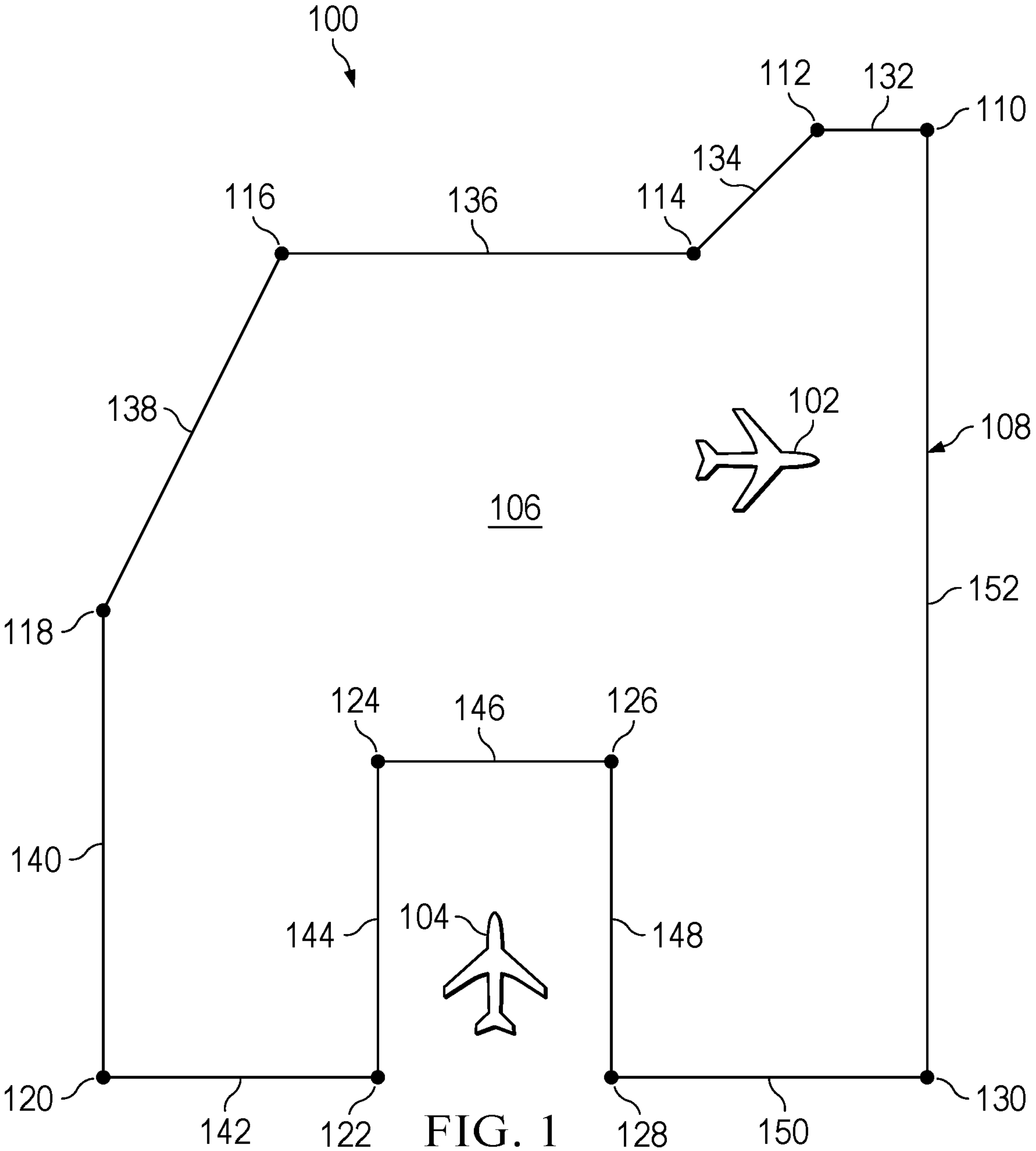
FIG. 1 is an illustration of aircraft operating in an area of aircraft operations including an airspace area of interest in accordance with illustrative embodiments.

The illustrative examples recognize and take into account different considerations. For example, the illustrative examples recognize and take into account that it is desirable to determine accurately and quickly whether an object is inside or outside of an area of interest. For example, it is desirable to be able to identify aircraft that are operating inside an airspace area of interest, such as an area of restricted airspace.

The illustrative embodiments also recognize and take into account that various mathematical solutions for determining whether a point is located within a polygon have been developed. One such solution counts the number of intersections between the sides of the polygon and a line extending from the point. Another solution calculates a winding number for the point. Such solutions may be applied to the problem of determining whether aircraft are inside an airspace area of interest and similar problems. However, current systems for solving this problem may have various limitations.

For example, current systems may not identify aircraft inside an airspace area of interest in a timely manner. In particular, the computing time required by current systems to identify aircraft inside an airspace area of interest may be undesirable when there are a relatively large number of aircraft to be considered or when the shape of the airspace area of interest is irregular. For example, the processing time required by current systems to identify aircraft in an airspace area of interest may be undesirable when the airspace area of interest is defined by a relatively large number of edges.

The illustrative embodiments provide a method and system for identifying objects in an area of interest both accurately and quickly. In accordance with the illustrative embodiments, the vertex points defining the boundary of an area of interest are converted to vertex angles in a polar coordinate system that is defined with reference to the area of interest. The locations of objects are converted to object angles in the same polar coordinate system. A number of intersections between the sides of the area of interest and a line extending from the location of an object are more quickly identified by using the vertex angles of the area of interest and the object angle of the object.

Processing speed of illustrative embodiments may be further improved by storing the vertex angles for the area of interest in a more easily searchable data structure. In accordance with an illustrative embodiment, the vertex angles for an area of interest may be stored in a sequence of binary search trees.

Illustrative embodiments may improve the speed of identifying objects in an area of interest when the number of objects is relatively large. Furthermore, illustrative embodiments may improve the speed of identifying objects in an area of interest even for irregularly shaped areas of interest defined by a relatively large number of edges.

Processing times for current systems and methods for identifying whether objects are inside of an area of interest typically may be on the order of N, where N is the number of vertex points defining the area of interest. Processing times for systems and methods for identifying whether objects are inside of an area of interest in accordance with the illustrative embodiments described herein may be improved to as low as on the order of $\log_2(N)$. For example, whereas current systems may process aircraft locations for an area defined by 31 vertices in 0.25 seconds, the embodiments described herein will accelerate that processing to 0.05seconds.

With reference now to the figures, FIG. 1 is an illustration of aircraft operating in an area of aircraft operations including an airspace area of interest in accordance with illustrative embodiments. Area of aircraft operations 100 may include any appropriate area in which aircraft may operate. In this example, aircraft 102 and aircraft 104 are operating in area of aircraft operations 100.

Airspace area of interest 106 is an area defined within area of aircraft operations 100. Airspace area of interest 106 includes the area within boundary 108. Boundary 108 of airspace area of interest 106 may be of any appropriate size and shape. In this example, boundary 108 of airspace area of interest 106 is defined by vertex points 110, 112, 114, 116, 118, 120, 122, 124, 126, 128, and 130 and line segments 132, 134, 136, 138, 140, 142, 144, 146, 148, and 150 extending between the vertex points.

The vertex points at each end of a line segment in boundary 108 are adjacent vertex points. For example, vertex points 110 and 112 are adjacent vertex points at the ends of line segment 132 in boundary 108.

As applied to the example illustrated in FIG. 1, illustrative embodiments as described herein may identify aircraft 102 as operating inside airspace area of interest 106 and aircraft 104 as operating outside of airspace area of interest 106 both accurately and in a timely manner.

Figure 2:
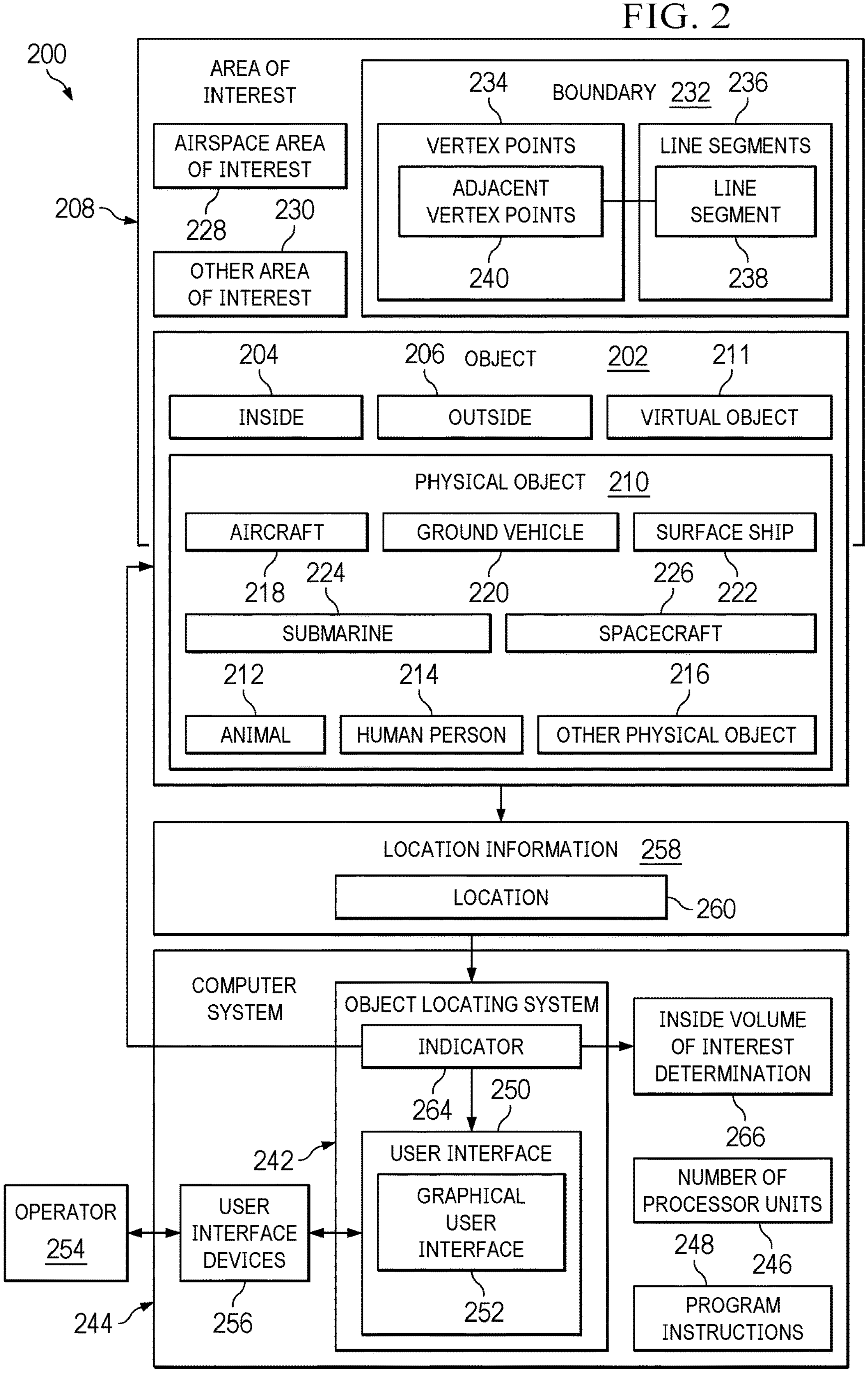
FIG. 2 depicts a block diagram of an object locating environment in accordance with illustrative embodiments.

Turning to FIG. 2, a block diagram of an object locating environment is depicted in accordance with illustrative embodiments. Object locating environment 200 may include any appropriate environment in which object 202 may be located inside 204 or outside 206 of area of interest 208.

Object 202 may include any appropriate type of physical object 210 or virtual object 211. Physical object 210 may include one or more physical objects and may include various different types of physical objects in any appropriate combination. For example, without limitation, physical object 210 may include one or more of vehicles such as one or more of aircraft 218, ground vehicle 220, surface ship 222, submarine 224, or spacecraft 226. Alternatively, or in addition, physical object 210 may include one or more of animal 212, human person 214, or other physical object 216.

Virtual object 211 may include any appropriate virtual implementation of any appropriate physical object in a virtual environment. Virtual object 211 also may be referred to as a digital object.

Area of interest 208 may include any appropriate area in which any appropriate object 202 may be located. For example, area of interest 208 for physical object 210 may include airspace area of interest 228 or other area of interest 230. For example, without limitation, aircraft 218 may be located inside 204 or outside 206 of airspace area of interest 228. Airspace area of interest 106 in FIG. 1 is an example of airspace area of interest 228.

Area of interest 208 for virtual object 211 may include any appropriate area in a virtual environment in which virtual object 211 may be located. For example, without limitation, area of interest for virtual object 211 may be an area within a virtual game or simulation environment.

Area of interest 208 is an area enclosed within boundary 232. In accordance with the illustrative embodiments, boundary 232 is defined by vertex points 234 and line segments 236 extending between vertex points 234. Vertex points 234 at the end of each line segment 238 in line segments 236 are adjacent vertex points 240.

In accordance with an illustrative embodiment, object locating system 242 is configured to determine whether object 202 is located inside 204 or outside 206 of area of interest 208. Object locating system 242 may be implemented in hardware or in hardware in combination with software in computer system 244.

Computer system 244 is a physical hardware system and includes one or more data processing systems. When more than one data processing system is present in computer system 244, those data processing systems are in communication with each other using a communications medium. The communications medium can be a network. The data processing systems can be selected from at least one of a computer, a server computer, a tablet computer, or some other suitable data processing system.

As depicted, computer system 244 includes a number of processor units 246 that are capable of executing program instructions 248 implementing processes in the illustrative examples. As used herein a processor unit in the number of processor units 246 is a hardware device and is comprised of hardware circuits such as those on an integrated circuit that respond and process instructions and program code that operate a computer. When a number of processor units 246 execute program instructions 248 for a process, the number of processor units 246 is one or more processor units that can be on the same computer or on different computers. In other words, the process can be distributed between processor units on the same or different computers in a computer system. Further, the number of processor units 246 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Object locating system 242 may include user interface 250. For example, user interface 250 may be graphical user interface 252. In accordance with an illustrative embodiment, operator 254 may interact with user interface 250 via appropriate user interface devices 256 to define area of interest 208.

Object locating system 242 is configured to receive location information 258 for object 202. Location information 258 may include any appropriate information that identifies location 260 of object 202.

Object locating system 242 is configured to use location information 258 to determine whether object 202 is inside 204 or outside 206 of area of interest 208 as described in more detail herein. Object locating system 242 may generate any appropriate indicator 264 to indicate whether object 202 is inside 204 area of interest 208. For example, indicator 264 may be presented to operator 254 in an appropriate manner via user interface 250. Indicator 264 may be provided as a message in appropriate form to physical object 202. As another example, indicator 264 may be provided as input to inside volume of interest determination 266.

Figure 3:
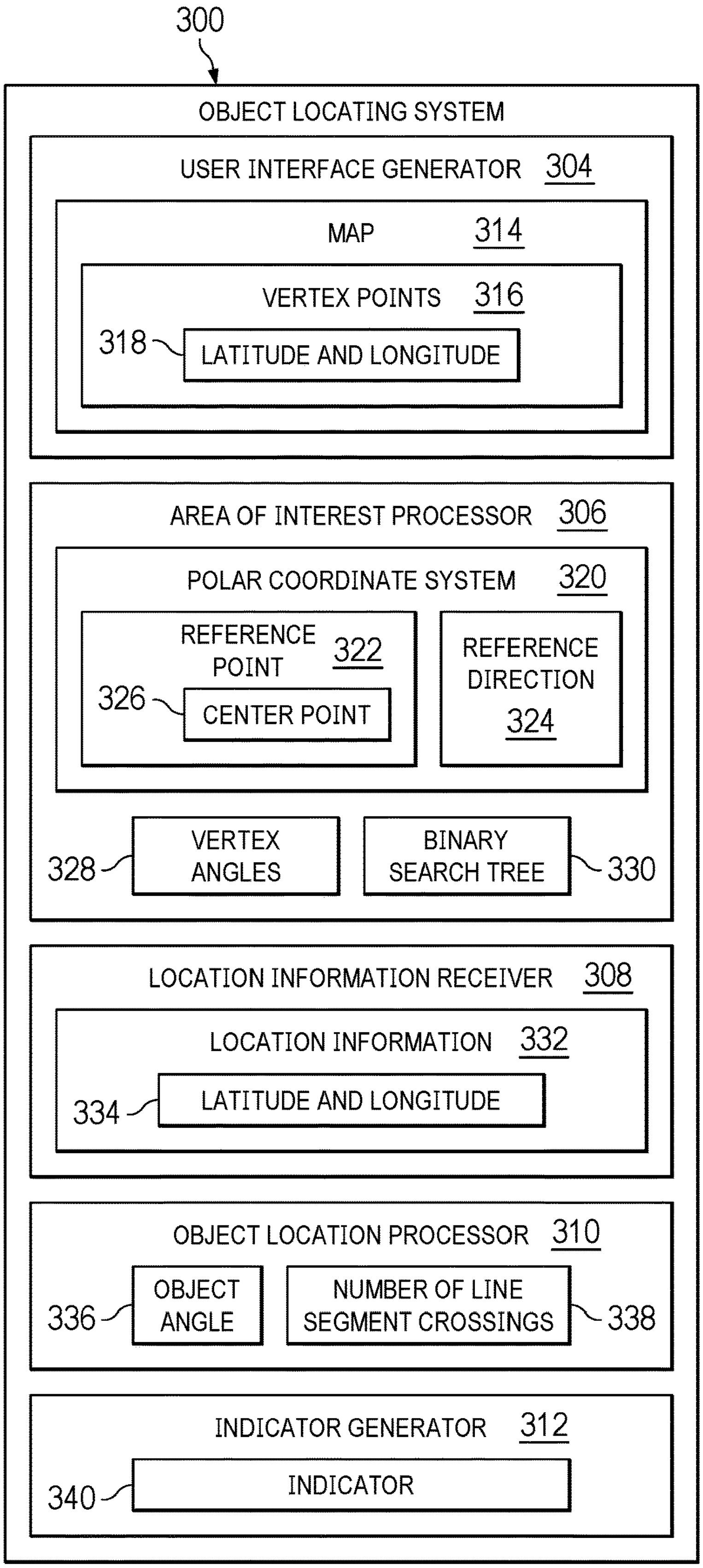
FIG. 3 depicts a block diagram of an object locating system in accordance with illustrative embodiments.

Turning to FIG. 3, a block diagram of an object locating system is depicted in accordance with illustrative embodiments. Object locating system 300 is an example of one implementation of object locating system 242 in FIG. 2. Object locating system 300 may include user interface generator 304, area of interest processor 306, location information receiver 308, object location processor 310, and indicator generator 312.

User interface generator 304 may be configured to generate a user interface, such as user interface 250 in FIG. 2, on which map 314 is displayed. Map 314 may be user selectable. A user may define an area of interest by indicating vertex points 316 for the area of interest on map 314. Latitude and longitude 318 may be generated automatically for each of vertex points 316 indicated by the user.

Area of interest processor 306 is configured to define polar coordinate system 320 relative to a defined area of interest by defining reference point 322 and reference direction 324 in the area of interest. For example, without limitation, reference point 322 may be center point 326 at or near a center of the area of interest.

Area of interest processor 306 converts the vertex points 316 to polar coordinate system 320, including determining vertex angles 328 for each of vertex points 316. Vertex angles 328 may then be stored in binary search tree 330.

Location information receiver 308 is configured to receive location information 332 identifying the location of an object. For example, without limitation, location information 332 may identify the location of the object by latitude and longitude 334.

Object location processor 310 is configured to convert the location of the object to polar coordinate system 320, including determining object angle 336 for the object. Object angle 336 and vertex angles 328 stored in binary search tree 330 then may be used to identify number of line segment crossings 338.

Indicator generator 312 is configured to generate indicator 340 to indicate whether the object is inside the area of interest based on number of line segment crossings 338.

Figure 4:
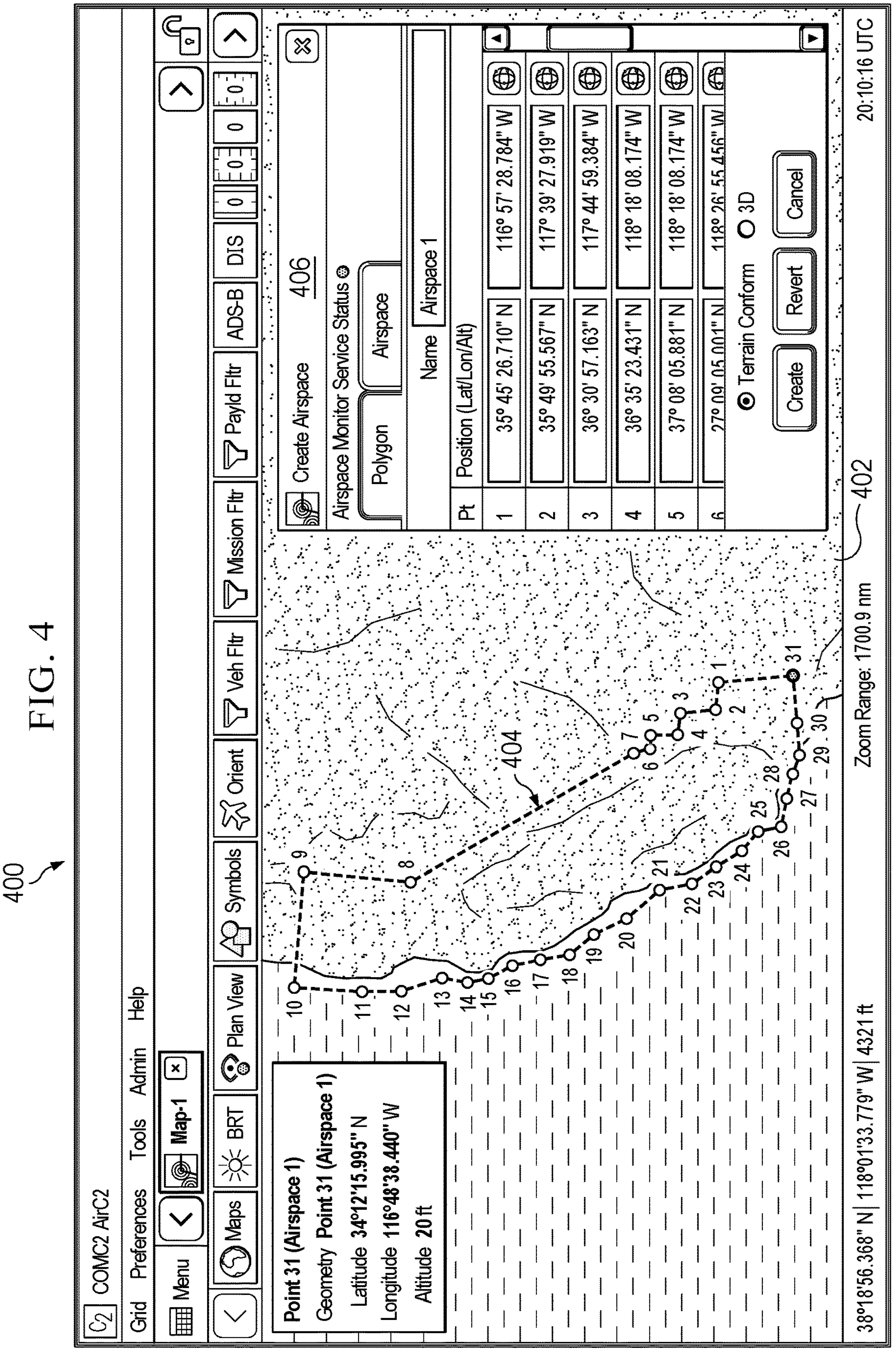
FIG. 4 is an illustration of a user interface for defining an airspace area of interest in accordance with illustrative embodiments.

Turning to FIG. 4, an illustration of a user interface for defining an airspace area of interest is depicted in accordance with illustrative embodiments. User interface 400 is an example of one implementation of user interface 250 in FIG. 2.

User interface 400 includes a displayed background map 402. Map 402 may be user selectable. A user defines area of interest 404 by selecting vertex points for the area of interest on map 404. The latitude and longitude coordinates of the selected vertex points may be displayed in an appropriate format in window 406 on user interface 400 or in another appropriate manner.

Figure 5:
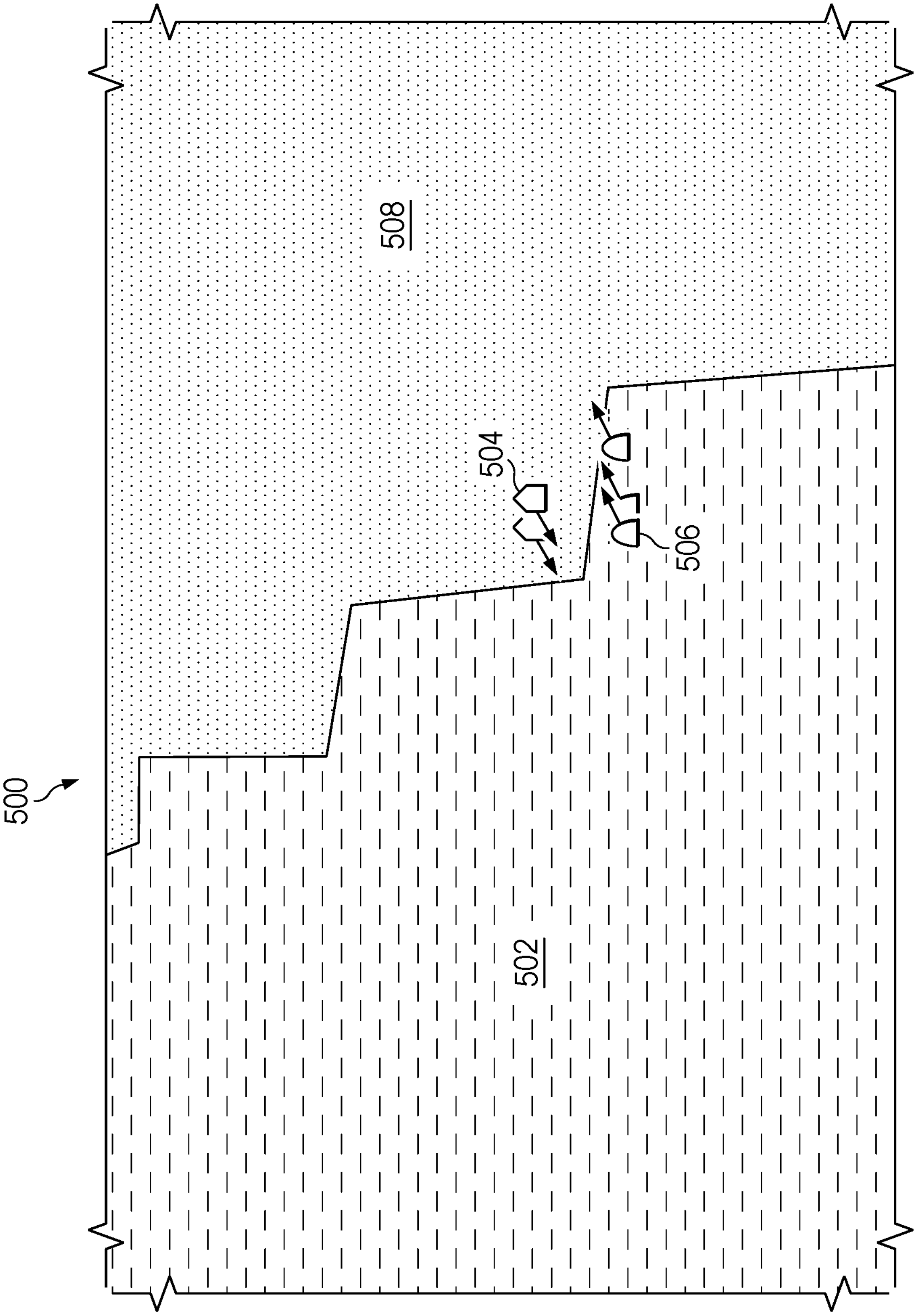
FIG. 5 is an illustration of a user interface including indicators for indicating whether aircraft are inside or outside of an airspace area of interest in accordance with illustrative embodiments.

Turning to FIG. 5, an illustration of a user interface including indicators for indicating whether aircraft are inside or outside of an airspace area of interest is depicted in accordance with illustrative embodiments. User interface 500 is a close-up view of a portion of map 402 in FIG. 4.

User interface 500 shows area 508 inside of an area of interest and area 502 outside of an area of interest. Indicators identify aircraft inside of the area of interest. Indicators 506 identify aircraft outside of the area of interest.

Figure 6:
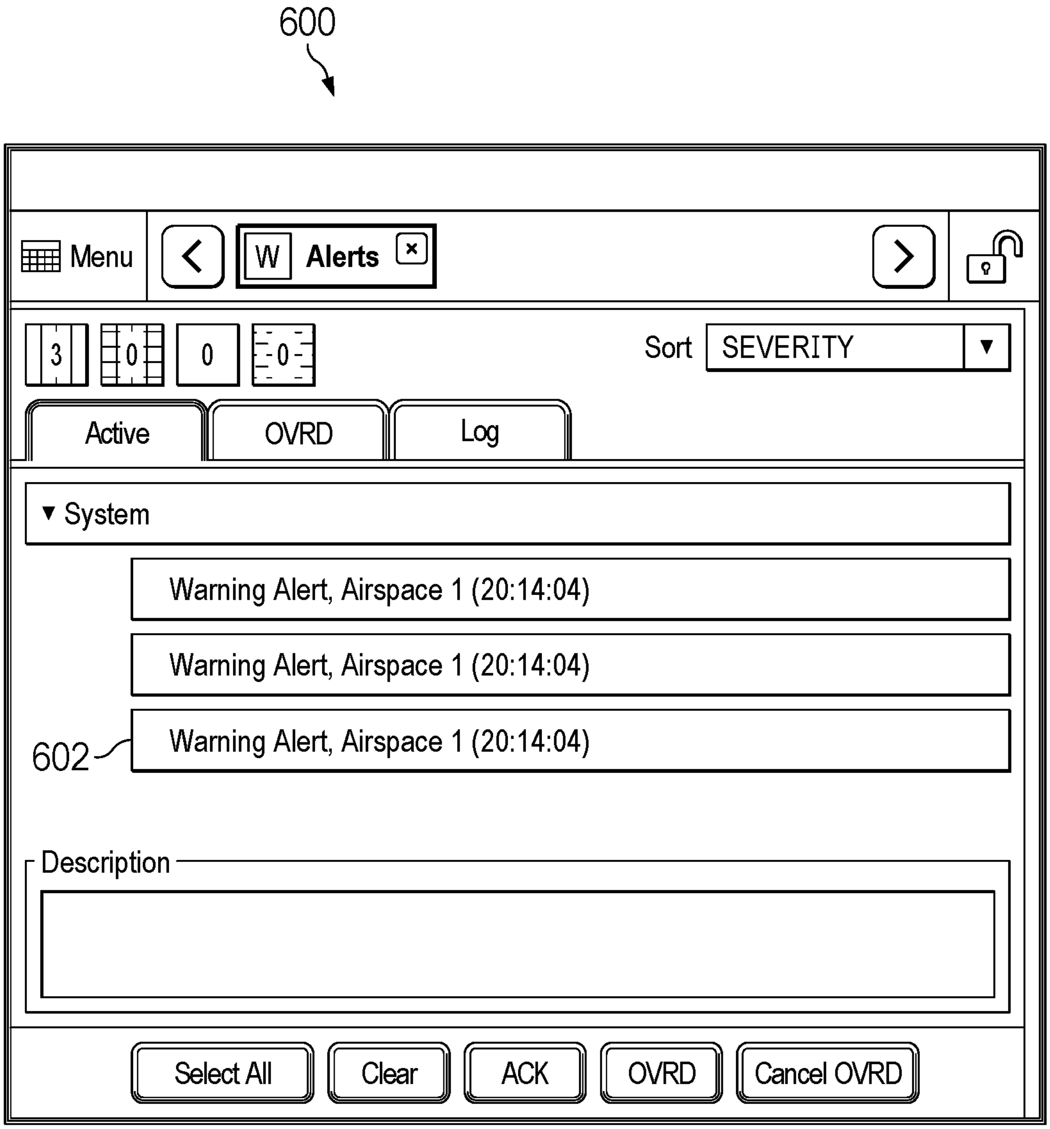
FIG. 6 is an illustration of a user interface including warning indicators for aircraft that are inside an airspace area of interest in accordance with illustrative embodiments.

Turning now to FIG. 6, an illustration of a user interface including warning indicators for aircraft that are inside an airspace area of interest is depicted in accordance with illustrative embodiments. User interface 600 is an example of another implementation of user interface 250 in FIG. 2. In user interface 600, indicators 602 are warning indicators for aircraft that are inside an airspace area of interest.

Figure 7:
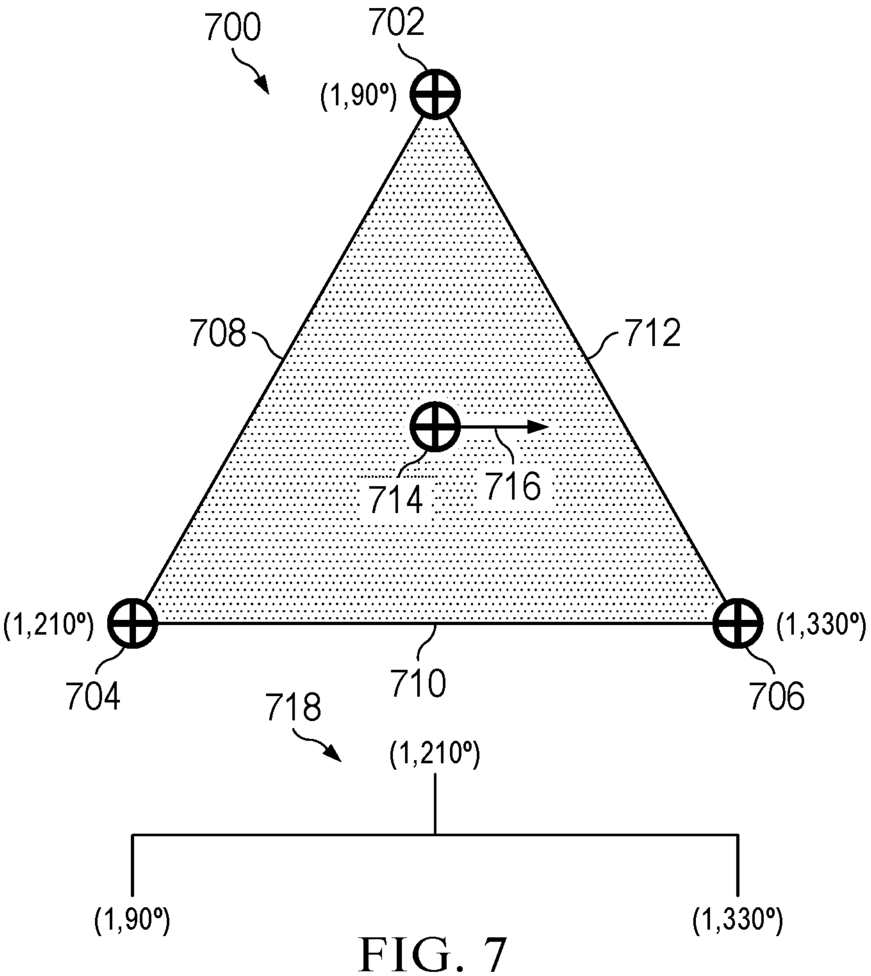
FIG. 7 is an illustration of an area of interest and a binary search tree for the area of interest in accordance with illustrative embodiments.

Turning to FIG. 7, an illustration of an area of interest and a binary search tree for the area of interest is depicted in accordance with illustrative embodiments. Area of interest 700 is an example of area of interest 208 in FIG. 2.

In this example, area of interest 700 is defined by vertex points 702, 704, and 706 and line segments 708, 710, and 712. Reference point 714 and reference direction 716 define a polar coordinate system for area of interest 700.

The coordinates of vertex points 702, 704, and 706 in the polar coordinate system are shown in FIG. 7. These coordinates include a distance of the vertex point from reference point 714 and a vertex angle for the vertex point. In accordance with an illustrative embodiment, these coordinates are stored in binary search tree 718.

Figure 8:
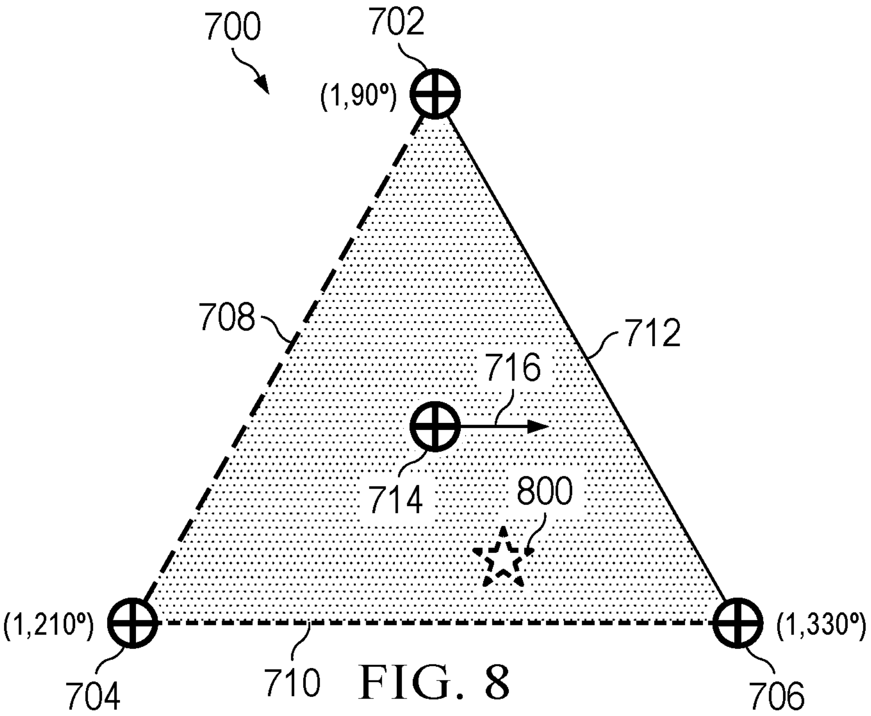
FIG. 8 is an illustration of an example of determining the location of an object inside an area of interest in accordance with illustrative embodiments.

Turning to FIG. 8, an illustration of an example of determining the location of an object inside an area of interest is depicted in accordance with illustrative embodiments. In this example, star symbol 800 indicates the location of the object inside of area of interest 700.

By searching binary search tree 718, line segment 710 is identified as a possible crossing line segment. Reference point 714 and object location 800 are determined to be on the same side of line segment 710. Therefore, line segment 710 is confirmed as a line crossing.

Figure 9:
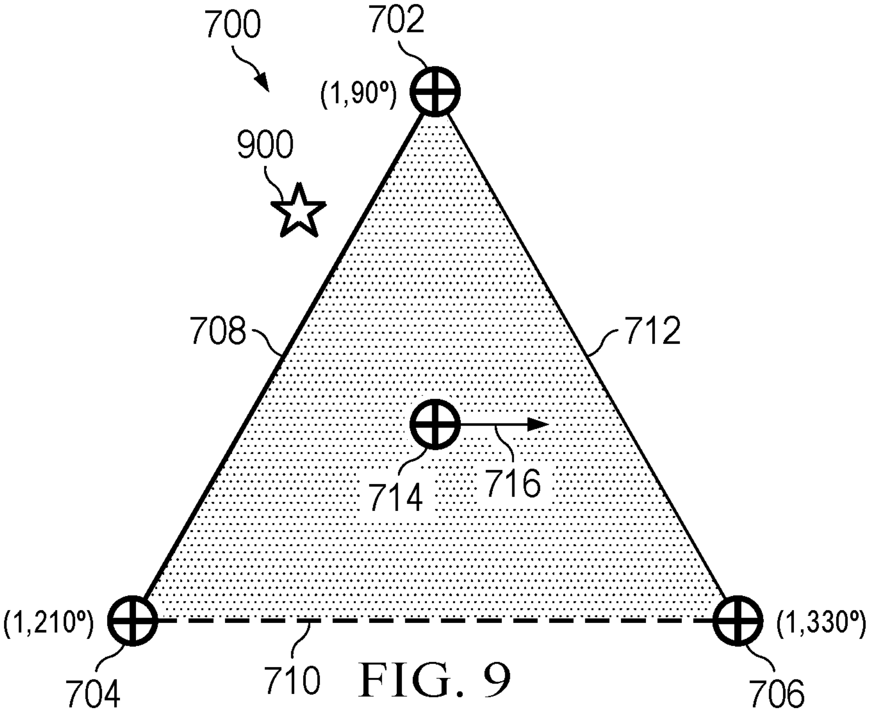
FIG. 9 is an illustration of an example of determining the location of an object outside of an area of interest in accordance with illustrative embodiments.

Turning to FIG. 9, an illustration of an example of determining the location of an object outside of an area of interest is depicted in accordance with illustrative embodiments. In this example, star symbol 900 indicates the location of an object outside of area of interest 700.

By searching binary search tree 718, line segment 708 is identified as a possible crossing line segment. In this case, reference point 714 and object location 900 are determined not to be on the same side of line segment 708. Therefore, line segment 708 is determined not to be a line crossing.

Figure 10:
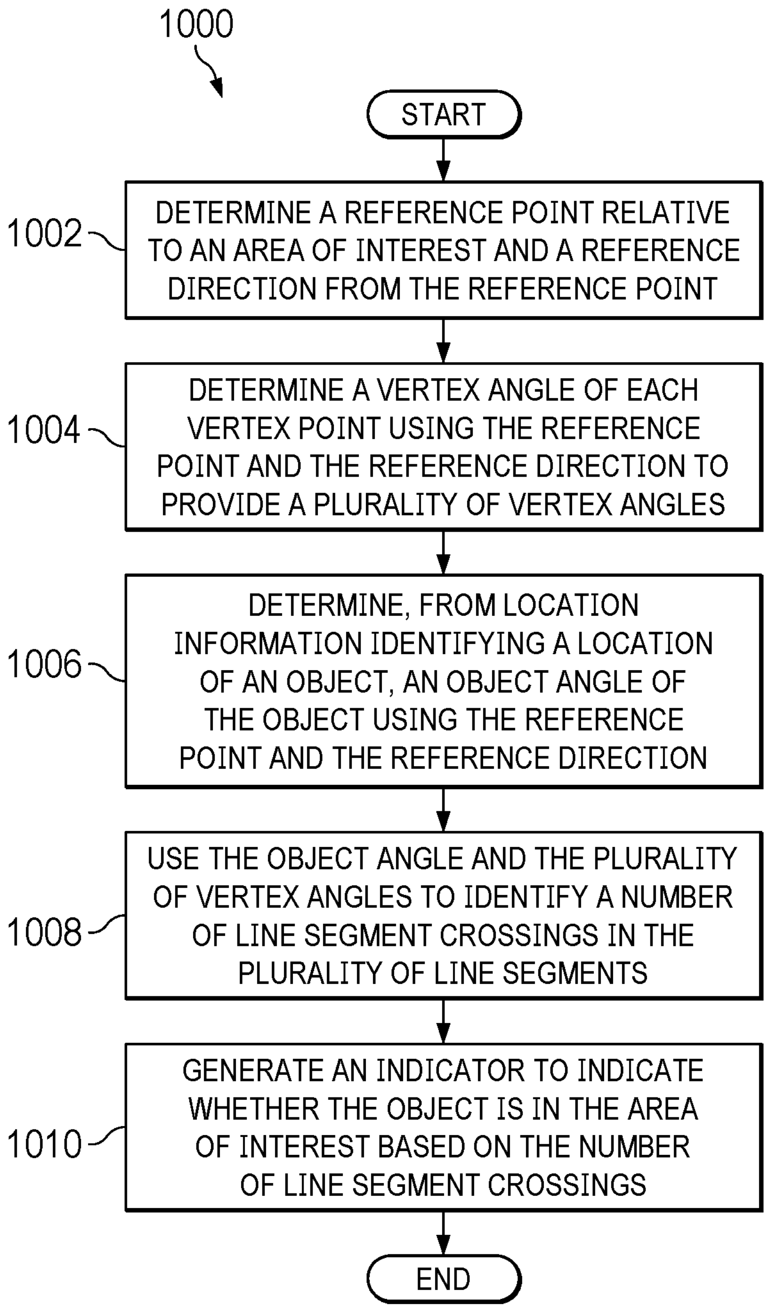
FIG. 10 is a flowchart depicting a method of determining whether an object is in an area of interest in accordance with illustrative embodiments.

Turning to FIG. 10, a flowchart depicting a method of determining whether an object is in an area of interest is depicted in accordance with illustrative embodiments. Method 1000 may be implemented in object locating system 300 in FIG. 3.

Method 1000 may begin with determining a reference point relative to the area of interest and a reference direction from the reference point (step 1002). Step 1002 defines a polar coordinate system with respect to the area of interest. A vertex angle of each vertex point is determined to provide a plurality of vertex angles (step 1004). The vertex angle of a vertex point is the angle between the reference direction and a line extending from the reference point to the vertex point.

An object angle of an object then may be determined from location information identifying a location of the object (step 1006). The object angle of the object is the angle between the reference direction and a line extending from the reference point to the object location.

The object angle and the plurality of vertex angles then may be used to identify a number of line segment crossings in the plurality of line segments (step 1008). An indicator then may be generated to indicate whether the object is in the area of interest based on the number of line segment crossings (step 1010), with the method terminating thereafter.

Figure 11:
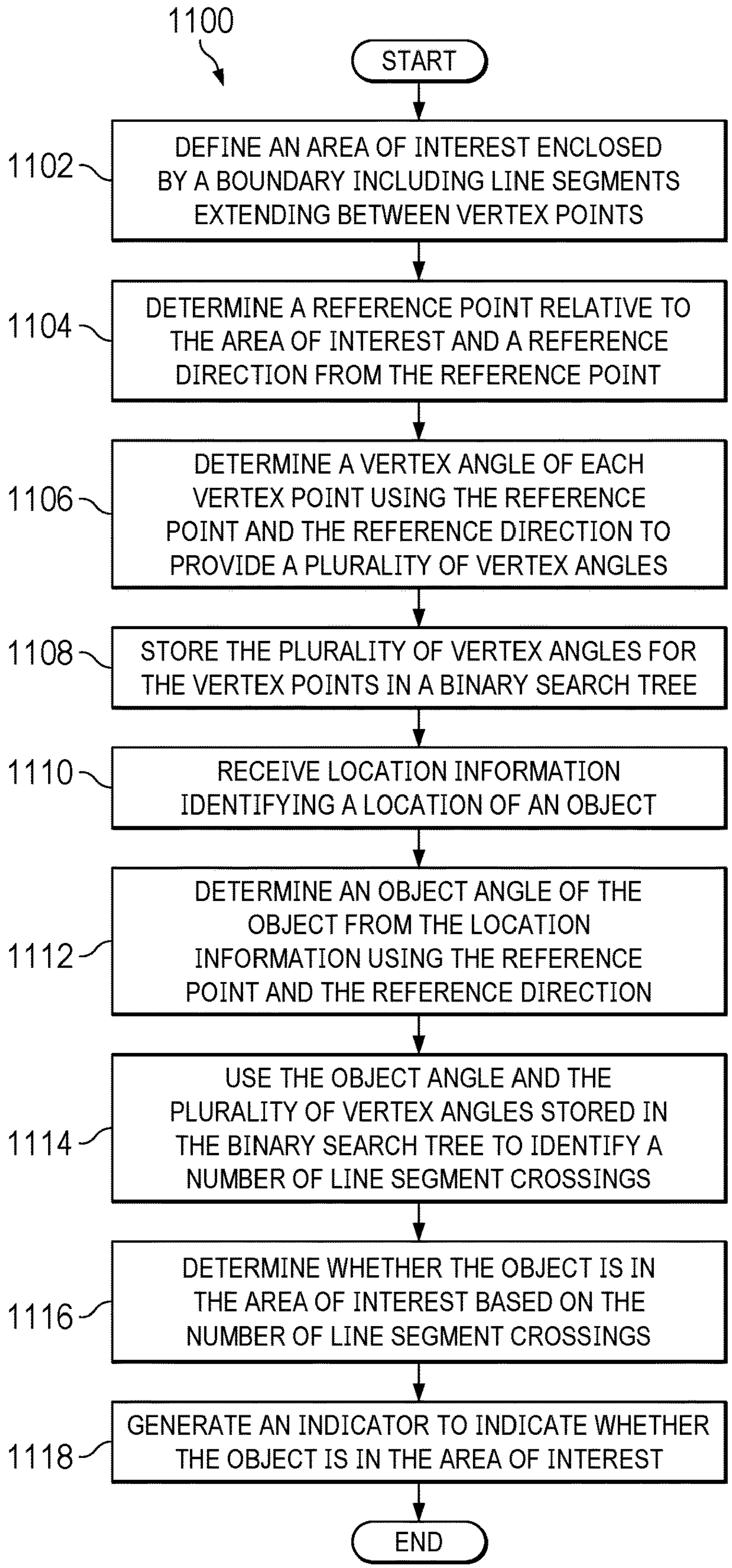
FIG. 11 is a flowchart depicting in more detail a method of determining whether an object is in an area of interest in accordance with illustrative embodiments.

Turning now to FIG. 11, a flowchart depicting in more detail a method of determining whether an object is in an area of interest is depicted in accordance with illustrative embodiments. Method 1100 may be implemented in object locating system 300 in FIG. 3.

Method 1100 begins with defining an area of interest enclosed by a boundary including line segments extending between vertex points (step 1102). A reference point and a reference direction from the reference point are determined relative to the area of interest (step 1104). Step 1104 defines a polar coordinate system with respect to the area of interest. A vertex angle of each vertex point is then determined in the polar coordinate system to provide a plurality of vertex angles (step 1106). The vertex angle of each vertex point is the angle between the reference direction and a line extending from the reference point to the vertex point. The plurality of vertex angles for the vertex points are stored in a binary search tree (step 1108).

Location information identifying the location of an object is received (step 1110). An object angle of the object is determined in the polar coordinate system from the location information (step 1112). The object angle of the object is the angle between the reference direction and a line extending from the reference point to the location of the object.

The object angle and the plurality of vertex angles stored in the binary search tree are used to identify a number of line segment crossings (step 1114). It is determined whether the object is inside the area of interest based on the number of line segment crossings identified (step 1116). An indicator is then generated to indicate whether the object is inside the area of interest (step 1118), with the method terminating thereafter.

Figure 12:
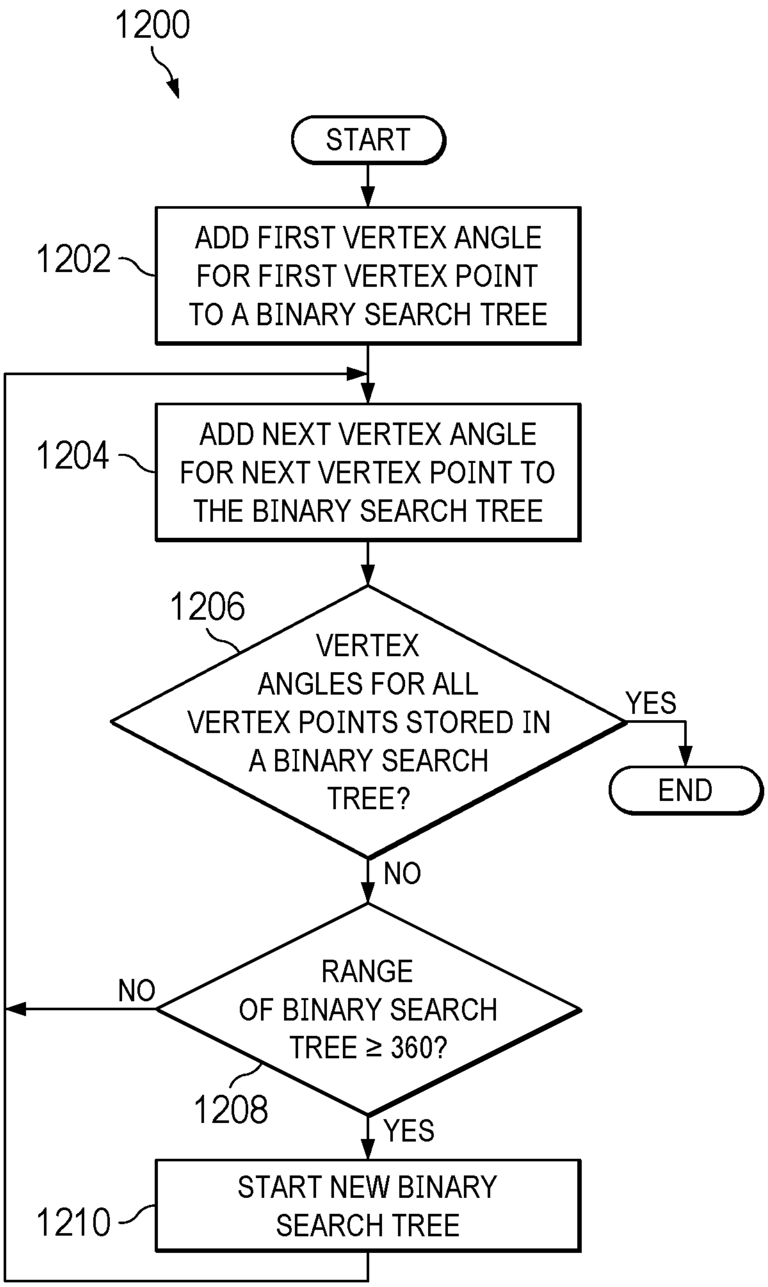
FIG. 12 is a flowchart depicting a method of storing vertex angles for an area of interest in a sequence of binary search trees in accordance with illustrative embodiments.

Turning to FIG. 12, a flowchart depicting a method of storing vertex angles for an area of interest in a sequence of binary search trees is depicted in accordance with illustrative embodiments. Method 1200 is an example of one possible implementation of step 1108 in method 1100 of FIG. 11.

Method 1200 begins by adding a first vertex angle for a first vertex point to a binary search tree (step 1202). The next vertex angle for the next vertex point along the boundary of the area of interest is then added to the binary search tree (step 1204). It is then determined whether all of the vertex angles for all of the vertex points defining the area of interest have been stored in a binary search tree (step 1206). The method terminates in response to a determination at step 1206 that all of the vertex angles have been stored in a binary search tree.

In response to a determination at step 1206 that all of the vertex angles have not been stored in a binary search tree, it is determined whether the range of the binary search tree to which vertex angles are being added is greater than or equal to 360 degrees (step 1208). In response to a determination at step 1208 that the range of the binary search tree to which vertex angles are being added is not greater than or equal to 360 degrees, the method returns to step 1204 and the next vertex angle is added to the binary search tree. In response to a determination at step 1208 that the range of the binary search tree to which vertex angles are being added is greater than or equal to 360 degrees, a new binary search tree is started (step 1210), and the method returns to step 1204 with the next vertex angle being added to the new binary search tree.

Figure 13:
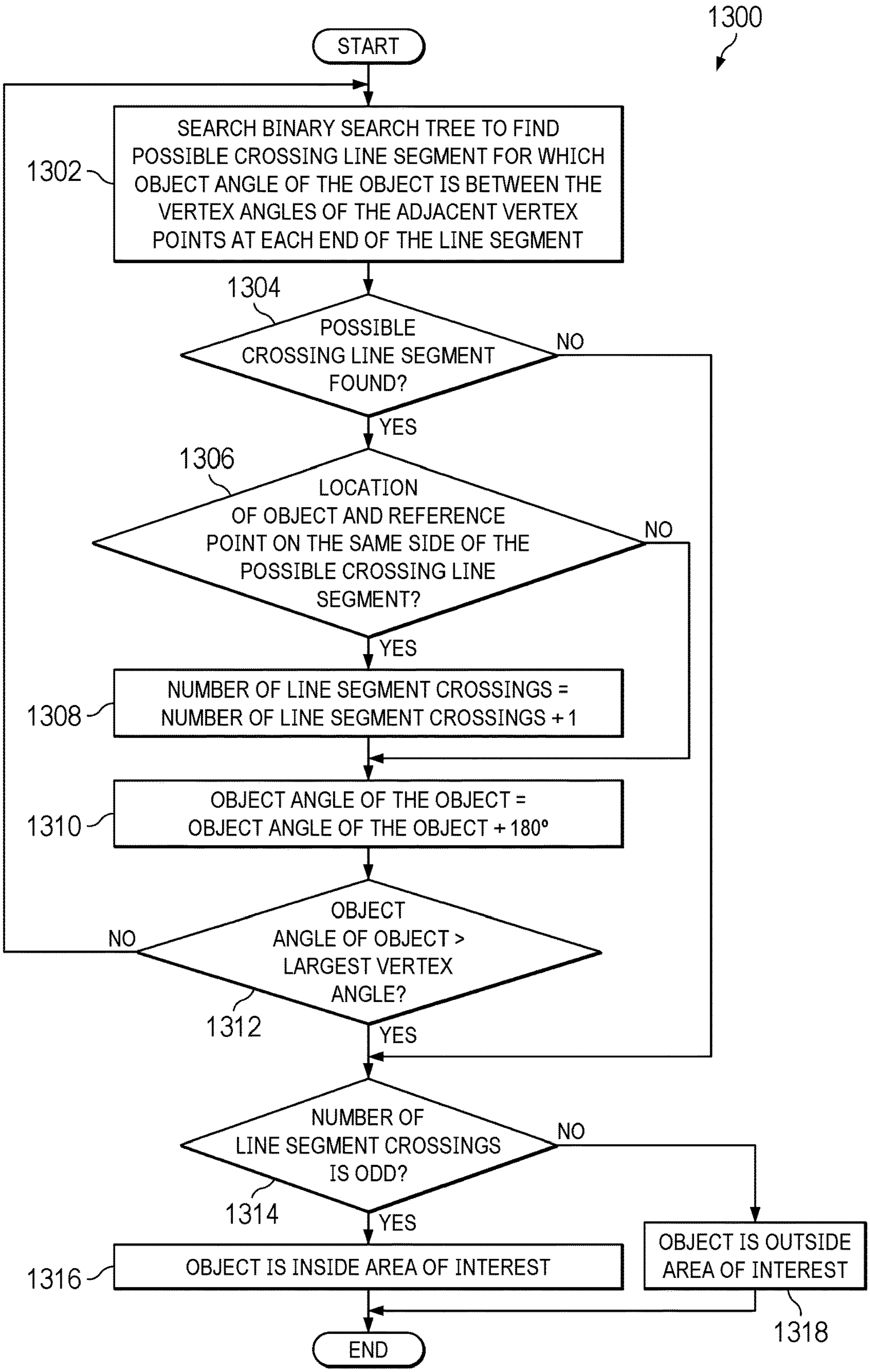
FIG. 13 is a flowchart depicting a method of using an object angle for an object and vertex angles for an area of interest to determine whether the object is in the area of interest in accordance with illustrative embodiments.

Turning to FIG. 13, a flowchart depicting a method of using an object angle for an object and vertex angles for an area of interest to determine whether the object is in the area of interest is depicted in accordance with illustrative embodiments. Method 1300 is an example of one possible implementation of steps 1114 and 1116 in method 1100 of FIG. 11. Method 1300 begins with the number of line segment crossings identified set to zero.

Method 1300 begins with searching a binary search tree to find a possible crossing line segment (step 1302). A possible crossing line segment is a line segment of the boundary of an area of interest for which the object angle of the object is between the vertex angles of the adjacent vertex points at each end of the line segment. It is determined whether a possible crossing line segment is found in the search of the binary search tree of step 1302 (step 1304).

In response to a determination at step 1304 that a possible crossing line segment is found, it is determined whether the location of the object and the reference point are on the same side of the possible crossing line segment (step 1306). In response to a determination at step 1306 that the location of the object and the reference point are on the same side of the possible crossing line segment, the number of line segment crossings identified is incremented (step 1308). In response to a determination at step 1306 that the location of the object and the reference point are not on the same side of the possible crossing line segment, step 1308 is skipped, and the number of line segment crossings identified is not increased.

The object angle of the object is then increased by 180 degrees (step 1310). It is then determined whether the increased object angle is greater than the largest vertex angle for the area of interest (step 1312). In response to a determination at step 1312 that the increased object angle is not greater than the largest vertex angle for the area of interest, the method returns to step 1302, and the binary search tree is searched to find a possible crossing line segment using the increased object angle.

In response to a determination at step 1304 that a possible crossing line segment is not found in the search of the binary search tree or a determination at step 1312 that the increased object angle is greater than the largest vertex angle for the area of interest, it is determined whether the number of line segment crossings identified is odd (step 1314). In response to a determination at step 1314 that the number of line segment crossings identified is odd, it is determined that the object is inside of the area of interest (step 1316), with the method terminating thereafter. In response to a determination at step 1314 that the number of line segment crossings identified is not odd, it is determined that the object is not inside of the area of interest (step 1318), with the method terminating thereafter.

Figure 14:
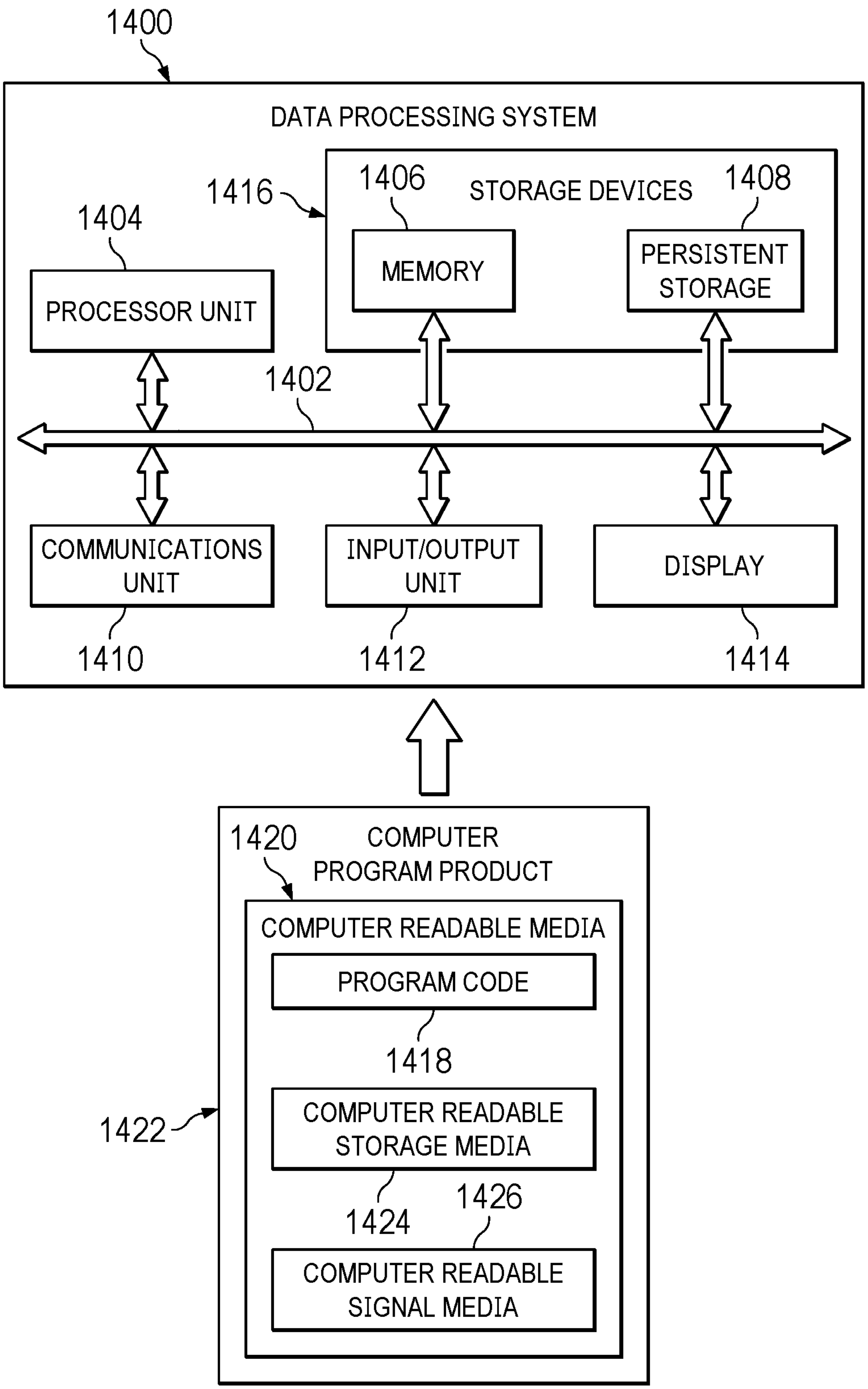
FIG. 14 is an illustration of a block diagram of a data processing system in accordance with illustrative embodiments.

Turning now to FIG. 14, a block diagram of a data processing system is depicted in accordance with an illustrative embodiment. Data processing system 1400 can be used to implement computer system 244 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer-readable program instructions that can be read and executed by a processor in processor unit 1404. The program instructions in the different embodiments can be embodied on different physical or computer-readable storage media, such as memory 1406 or persistent storage 1408.

Program instructions 1418 is located in a functional form on computer-readable media 1420 that is selectively removable and can be loaded onto or transferred to data processing system 1400 for execution by processor unit 1404. Program instructions 1418 and computer-readable media 1420 form computer program product 1422 in these illustrative examples. In the illustrative example, computer-readable media 1420 is computer-readable storage media 1424.

Computer-readable storage media 1424 is a physical or tangible storage device used to store program instructions 1418 rather than a medium that propagates or transmits program instructions 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer-readable signal media. The computer-readable signal media are signals and can be, for example, a propagated data signal containing program instructions 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program instructions 1418 can be located in computer-readable media 1420 in the form of a single storage device or system. In another example, program instructions 1418 can be located in computer-readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer-readable media 1420 in a server computer while another portion of program instructions 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. As used herein, the term "substantially" or "approximately" when used with respect to measurements is determined by the ordinary artisan and is within acceptable engineering tolerances in the regulatory scheme for a given jurisdiction, such as but not limited to the Federal Aviation Administration Federal Aviation Regulations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. The steps shown in the flowchart might occur in a different order than the specific sequence of blocks shown.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of reducing a processing time for a computer system identifying an object in an area of interest, the method comprising the computer system executing program instructions at a rate accelerated on the order of log2 (N) for:

determining a reference point relative to the area of interest and a reference direction from the reference point, wherein the area of interest comprises a shape of an irregular polygon enclosed by a boundary comprising a plurality of line segments extending between vertex points, wherein N is a total number of vertex points in the irregular polygon;

determining a vertex angle of each vertex point to provide a plurality of vertex angles, wherein the vertex angle of a vertex point is an angle between the reference direction and a line extending from the reference point to the vertex point;

determining from location information identifying a location of the object, an object angle of the object, wherein the object angle of the object is an angle between the reference direction and a line extending from the reference point to the location of the object;

using the object angle and the plurality of vertex angles to identify a number of line segment crossings in the plurality of line segments; and generating an indicator to indicate whether the object is in the area of interest based on the number of line segment crossings.

2. The method of claim 1, wherein:
the processing time is reduced to 0.05 seconds; and
the object is a physical object selected from one of an aircraft, a ground vehicle, a surface ship, a submarine, a spacecraft, an animal, and a human person.

3. The method of claim 1, wherein the area of interest is an airspace area of interest and further comprising defining the area of interest by receiving, by the computer system, a latitude and longitude defining each of the vertex points.

4. The method of claim 1, wherein the reference point is a center point in the area of interest.

5. The method of claim 1, wherein a line segment crossing in the number of line segment crossings comprises a line segment in the plurality of line segments wherein a line starting at the location of the object and extending away from the reference point in a direction from the reference point to the location of the object crosses the boundary of the area of interest.

6. The method of claim 1, wherein vertex points at each end of a line segment in the plurality of line segments are adjacent vertex points, and wherein using the object angle and the plurality of vertex angles to identify the number of line segment crossings comprises:
identifying, by the computer system, a line segment in the plurality of line segments for which the object angle of the object is between the vertex angles of the adjacent vertex points at each end of the line segment as a possible crossing line segment;
determining, by the computer system, whether the location of the object and the reference point are on a same side of the possible crossing line segment; and
identifying, by the computer system, the possible crossing line segment as a line segment crossing in response to a determination that the location of the object and the reference point are on the same side of the possible crossing line segment.

7. The method of claim 6 further comprising:
identifying, by the computer system, a line segment in the plurality of line segments for which the object angle of the object plus 180 degrees is between the vertex angles of the adjacent vertex points at each end of the line segment as another possible crossing line segment;
determining, by the computer system, whether the location of the object and the reference point are on a same side of an other possible crossing line segment; and
identifying, by the computer system, the other possible crossing line segment as a line segment crossing in response to a determination that the location of the object and the reference point are on the same side of the other possible crossing line segment.

8. The method of claim 6 further comprising:
storing, by the computer system, the plurality of vertex angles for the vertex points in a binary search tree; and
searching, by the computer system, the binary search tree to identify the line segment in the plurality of line segments for which the object angle of the object is between the vertex angles of the adjacent vertex points at each end of the line segment as the possible crossing line segment.

9. The method of claim 1, wherein generating the indicator to indicate whether the object is in the area of interest comprises:
displaying, by the computer system, a map of an area including the area of interest; and
displaying, by the computer system, the indicator to indicate the location of the object on the map and whether the object is in the area of interest.

10. The method of claim 1, wherein the indicator is selected from one of a graphical indicator, a message, and an audio indicator.

11. A method of identifying an object in an area of interest, the method comprising a computer system executing program instructions at a rate accelerated on the order of $\log_2(N)$:
defining the area of interest, wherein the area of interest comprises a shape of an irregular polygon enclosed by a boundary comprising a plurality of line segments extending between vertex points, wherein vertex points at each end of a line segment in the plurality of line segments are adjacent vertex points, and N is a total number of vertex points, wherein N is a total number of vertex points in the irregular polygon;
determining a reference point relative to the area of interest and a reference direction from the reference point;
determining a vertex angle of each vertex point to provide a plurality of vertex angles, wherein the vertex angle of a vertex point is an angle between the reference direction and a line extending from the reference point to the vertex point;
storing the plurality of vertex angles for the vertex points in a binary search tree;
receiving location information identifying a location of the object;
determining, from the location information, an object angle of the object, wherein the object angle of the object is an angle between the reference direction and a line extending from the reference point to the location of the object;
using the object angle and the plurality of vertex angles stored in the binary search tree to identify a number of line segment crossings in the plurality of line segments;
determining whether the object is in the area of interest based on the number of line segment crossings; and
generating an indicator to indicate whether the object is in the area of interest.

12. The method of claim 11, wherein storing the plurality of vertex angles for the vertex points in a binary search tree comprises:
storing, by the computer system, vertex angles for the vertex points in a binary search tree until a range of the binary search tree is greater than or equal to 360 degrees; and
repeating, by the computer system, the step of storing vertex angles for the vertex points in a binary search tree until the plurality of vertex angles for all of the vertex points are stored in binary search trees forming a sequence of binary search trees.

13. The method of claim 11, wherein using the object angle and the plurality of vertex angles stored in the binary search tree to identify the number of line segment crossings in the plurality of line segments comprises:
searching, by the computer system, the binary search tree to identify possible crossing line segments in the plurality of line segments for which the object angle of the object is between the vertex angles of the adjacent vertex points at each end of the line segments;
for each of the possible crossing line segments, determining, by the computer system, whether the location of the object and the reference point are on a same side of a possible crossing line segment; and
for each of the possible crossing line segments, identifying, by the computer system within 0.05 seconds, the possible crossing line segment as a line segment crossing in response to a determination that the location of the object and the reference point are on the same side of the possible crossing line segment.

14. An object locating system configured to reduce a processing time for a computer system on the order of $\log_2(N)$ and identify an object in an area of interest, wherein the object locating system comprises:

an area of interest processor located in an object locating system within the computer system and configured to:

determine a reference point relative to the area of interest and a reference direction from the reference point, wherein the area of interest comprises a shape of an irregular polygon enclosed by a boundary comprising a plurality of line segments extending between vertex points, wherein N is a total number of vertex points in the irregular polygon; and determine a vertex angle of each vertex point to provide a plurality of vertex angles, wherein the vertex angle of a vertex point is an angle between the reference direction and a line extending from the reference point to the vertex point; and an object location processor located in the computer system, wherein the object location processor is configured to:

determine, from location information identifying a location of the object, an object angle of the object, wherein the object angle of the object is an angle between the reference direction and a line extending from the reference point to the location of the object, use the object angle and the plurality of vertex angles to identify a number of line segment crossings in the plurality of line segments; and generate, based on the number of line segment crossings, an indication of whether the object is in the area of interest.

15. The object locating system of claim 14, wherein:

the processing time is reduced to 0.05 seconds, and the object is a physical object selected from one of an aircraft, a ground vehicle, a surface ship, a submarine, a spacecraft, an animal, and a person.

16. The object locating system of claim 14, wherein the area of interest is an airspace area of interest and wherein the area of interest processor is configured to receive a latitude and longitude defining each of the vertex points.

17. The object locating system of claim 14, wherein the area of interest processor is configured to determine the reference point as a center point in the area of interest.

18. The object locating system of claim 14, wherein vertex points at each end of a line segment in the plurality of line segments are adjacent vertex points, and wherein the object location processor is configured to:

identify a line segment in the plurality of line segments for which the object angle of the object is between the vertex angles of the adjacent vertex points at each end of the line segment as a possible crossing line segment;

determine whether the location of the object and the reference point are on a same side of the possible crossing line segment; and identify the possible crossing line segment as a line segment crossing in response to a determination that the location of the object and the reference point are on a same side of the possible crossing line segment.

19. The object locating system of claim 18, wherein:

the area of interest processor is configured to store the plurality of vertex angles for the vertex points in a binary search tree; and the object location processor is configured to search the binary search tree to identify the line segment in the plurality of line segments for which the object angle of the object is between the vertex angles of the adjacent vertex points at each end of the line segment as the possible crossing line segment.

20. The object locating system of claim 14, wherein the indication is selected from one of a graphical indicator, a message, and an audio indicator.

* * * * *